United States Patent Office 2,976,294
Patented Mar. 21, 1961

2,976,294
DYE INTERMEDIATES

John Charles Firestine, South River, N.J., assignor to E. I. du Pont de Nemours and Company, Wilmington, Del., a corporation of Delaware No Drawing. Filed Jan. 26, 1959, Ser. No. 788,723

4 Claims. (Cl. 260—310)

This invention relates to polymerizable dye intermediates and more particularly to acrylamido and alpha-alkacrylamido dye intermediates and to compositions containing the same.

A large number of dye intermediates or color formers capable of forming azomethine dyes during color coupling development of exposed silver halide images are known. They vary widely in structure and constitution. Many of them are non-diffusing because of the presence of high-molecular weight radicals. Polymeric color formers are known and they are generally made by reacting a polymeric compound with a momomeric compound containing a dye intermediate or color former nucleus. Color formers capable of forming high polymers by addition polymerization are few in number and limited in structure and properties.

An object of this invention is to provide a new class of addition-polymerizable color formers. Another object is to provide such compounds which couple during color forming development to form polymeric azomethine dyes. A further object is to provide such compounds which can be used either in monomeric or in polymeric form in processes of 3-color photography. Still further objects will be apparent from the following description of the invention.

The novel addition polymerizable compounds provided the art in accordance with this invention are acrylamido and alpha-alkyl-substitued acrylamide derivatives of active methylene compounds having a reactive amino group. These compounds can be represented by the general formula $$CH_2=C-C-N-Q$$
$$\phantom{CH_2=C-}|\phantom{C-}\|\phantom{N}$$
$$\phantom{CH_2=C-}R\phantom{-}O$$

wherein Q is an organic radical which contains an acyclic or intracyclic active methylene group, said radical preferably being attached to the $$-\underset{|}{\overset{H}{N}}-$$

group in the formula through a cyclic carbon atom of a carbocyclic or heterocyclic nucleus containing 5 to 6 nuclear atoms and R is H, alkyl of 1 to 4 carbon atoms, aryl, aralkyl and chlorine.

In the foregoing compounds the active methylene group (—CH$_2$—) is rendered mobile by the proximity of certain unsaturated groups, for example

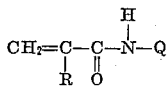

and others. The —CH$_2$— group is usually present between two such groups, e.g.

—COCH$_2$CO—  —COCH$_2$CN  

in a cyclic or acyclic system. The enol forms of these examples are

and

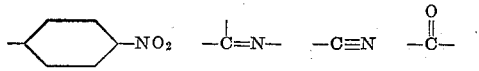

respectively.

The addition polymerizable compounds having the above formula can be prepared in a simple manner by reacting an acrylyl or alpha-alkacrylyl halide, e.g., acrylyl chloride, acrylyl bromide, methacrylyl chloride or methacrylyl bromide with a color former containing an active methylene group and having an amino group with at least one available hydrogen atom attached to the amino nitrogen atom which, in turn, is preferably attached to a cyclic carbon atom of a heterocyclic radical of aromatic type or an aromatic carbocyclic radical. Among the representative useful color formers utilized in making the addition polymerizable compounds of this invention are amino pyrazolones, aminophenylacetonitriles and aminobenzoylacetanilides.

By conventional addition polymerization reactions the monomeric compounds having the formula given above can be converted into addition polymers having carbon chains of considerable length. Solvent and emulsion polymerization techniques can be used with the aid of the usual addition polymerization initiators including the thermally-active and light-activated types. Suitable initiators include organic peroxides; e.g., benzoyl peroxide, azonitriles; vicinal ketaldonyl compounds, e.g., diacetyl; alpha-ketaldonyl compounds, e.g., benzoin and pivaloin; acyloin ethers, e.g., benzoin methyl and ethyl ethers; polynuclear quinones, e.g., anthraquinone and naphthoquinone and ionic catalysts, e.g., AlCl$_3$Cl$_3$ and BF$_3$. The resulting addition polymers can be used in photographic colloid-silver halide emulsion layers of multicolor films since they do not migrate or diffuse in the conventional water-permeable colloid binding agents; for example, gelatin.

The monomeric and polymeric color formers referred to above can be used in aqueous alkaline photographic developer solutions containing the usual alkalies, e.g., sodium or potassium hydroxide, carbonate or bicarbonate, and a primary aromatic amine color developing agent. Suitable such agents are disclosed in McQueen U.S. Patent 2,367,036, January 9, 1945. The preferred agents are asymmetric dialkyl-p-phenylenediamines wherein the alkyl radicals contain 1 to 4 carbons, e.g., p-amino-N-diethylamino aniline. These compounds are usually in the form of their organic or inorganic salts, for example, the hydrochlorides, sulfates and acetates.

The invention will be further illustrated by but is not intended to be limited to the following examples.

EXAMPLE I

*1 - (m - methacrylamidophenyl) - 5 - pyrazolone - 3-carboxylic acid*

To a 500-ml. three-necked, round-bottomed flask fitted with a reflux condenser, stirrer and thermometer there were added 21.9 g. (0.1 mol) 1-(m-aminophenyl)-5-pyrazolone-3-carboxylic acid, 140 ml. water and 70 g. of K$_2$CO$_3$. The mixture was cooled to 10° C. with stirring and 10.4 g. methacrylyl chloride was added dropwise keeping the temperature between 10° and 15° C. Hydrochloric acid was then added until the mixture tested acid to litmus paper. The tan solid (1-(m-methacrylamidophenyl)-5-pyrazolone carboxylic acid) that separated was collected on a Buchner funnel and air dried. This color former yields a magenta dye upon color coupling development as described after the examples.

EXAMPLE II

*m-Methacrylamido-alpha-benzoylacetanilide*

To a 1-liter, 3-necked flask fitted with a stirrer, dropping funnel and a Vigreaux distilling column, there were added 84.4 g. (0.44 mol) ethyl benzoyl acetate in 100 ml. dry xylene and 52.8 g. (0.4 mol) m-nitroaniline in 200 ml. xylene. After the two solutions were thoroughly mixed, the ethanol formed by the reaction was distilled off. The solution was then cooled whereupon a solid separated out which was filtered off, washed with xylene and dried in air. The yield of m-nitro-alpha-benzoyl acetanilide which melted at 143–5° C. was 79 g. (78% of theory).

A mixture of 28.4 g. of the m-nitro-alpha-benzoyl-acetanilide, 200 ml. of absolute alcohol and 0.2 g. of catalytic palladium on charcoal was placed in the reaction bottle of a low pressure catalytic hydrogenation apparatus (Parr, shaker type) and reacted at 60 lbs. per sq. in. pressure, until the calculated amount of hydrogen was taken up. The crude product which separated out was redissolved by heating and the catalyst filtered off. On cooling 16 g. (50% of theory) of a white solid, m-amino-alpha-benzoyl-acetanilide, separated out, M.P. 160–162° C.

To a 250-ml. Erlenmeyer flask was added 25.4 g. of the m-amino-alpha-benzoylacetanilide and 15.6 g. of methacrylyl chloride. The mixture was heated on a steam bath at 60° C. for 10–15 minutes and then cooled by addition of cracked ice. The reaction mixture was stirred with 100 ml. of 5% sodium carbonate, and the solid was filtered off, washed with water and acetone successively and recrystallized from 1 liter of ethanol. The yield of the white solid, m-methacrylamido-alpha-benzoylacetanilide, obtained was 8 g. (20% of theory); M.P. 204–206° C.

EXAMPLE III

*2-chloro-4-methacrylamido-alpha-benzoylacetanilide*

A mixture of 800 ml. xylene, 400 ml. toluene, 8 g. sodium acetate and 340 g. 2-chloro-4-nitro aniline were heated in a 3-liter round bottom flask fitted with a stirrer and fractionating column to 125° C. At this temperature 420 g. of ethyl benzoylacetate was run in and the resulting mixture heated at 134 to 138° C. for 24 hours during which time the solvent was allowed to distill out of the mixture using a small fractionating column. After cooling to 10° C., crystals were collected on a filter and washed with ethanol giving a yield of 310 g. of 2-chloro-4-nitrobenzoylacetanilide. The melting point was 178–180° C.; and increased to 181–182° C. after recrystallization from ethylene glycol monoethyl ether.

To a mixture of 1000 ml. of water, 1000 ml. of isopropanol, 20 ml. of glacial acetic acid and 100 g. of iron filings, heated to 80° C., there was added 160 g. of 2-chloro-4-nitrobenzoylacetanilide over a period of 10 minutes. After heating under reflux (83° C.) for 1 hour and 15 minutes, the mixture was cooled to 75° C. and 16 g. of decolorizing charcoal was added. The mixture was heated to 83° C. and filtered hot on a steam heated funnel. The filter cake was washed with 500 ml. of boiling isopropanol. After cooling to 5° C., 120 ml. of concentrated hydrochloric acid was added to the filtrate. After cooling in an ice bath for a few hours, gray needles of 4-amino-2-chloro-benzoylacetanilide hydrochloride were collected on a funnel and washed with acetone; weight 124 g. (76%); M.P. 180–186° C., indefinite because of decomposition.

A 1.0 g. portion of this product was triturated with an excess of sodium carbonate in water at 45° C. for 10 minutes. Almost colorless needles were collected on a filter and washed with water; M.P. 138–139° C. Recrystallization from 8 ml. of alcohol gave colorless needles; M.P. 141–142° C.

*Analysis.*—Calc'd. for: $C_{15}H_{13}N_2O_2Cl$ (288.7) C, 62.4; H, 4.5; Cl, 12.3. Found: C, 62.4; H, 4.7; Cl, 12.6.

To a 2-liter round-bottomed flask fitted with a stirrer, dropping funnel and thermometer there were added 600 ml. of dry pyridine and 97.5 grams of the above prepared 4-amino-2-chloro-benzoylacetanilide hydrochloride. The mixture was stirred and cooled to 10° C. using an ice bath. To the stirred mixture, 35 g. (a slight excess) of methacrylyl chloride was added dropwise keeping the temperature below 15° C. After complete addition of the acid chloride, the solution was stirred for 15 minutes and then warmed to 30° C. The solution was poured onto cracked ice and the desired product separated as a tan solid. The product was filtered on a suction filter, washed with water and then recrystallized from ethanol to yield 68 g. of an almost white solid with M.P. 163–165° C. (63% of theoretical yield).

*Analysis.*—Calc'd. for: $C_{19}H_{17}Cl\,N_2O_3$:C, 63.9; H, 4.77; Cl, 9.96. Found: C, 63.91; H, 4.79; Cl, 10.04.

EXAMPLE IV

*4-acrylamido-2-chloro-alpha-benzoylacetanilide*

A mixture of 10.68 g. (.03 mol) of 4-amino-2-chloro-alpha-benzoylacetanilide hydrochloride (prepared as described in Example III) and 150 ml. dry pyridine were added to a 250 ml. round bottom flask fitted with a stirrer. With continual stirring the mixture was cooled to 10° C. and 4.05 g. (.03 mol) acrylyl chloride was added dropwise. The mixture was warmed to 40° C., then poured onto cracked ice where a viscous material separated. After decanting the water, the residue was purified by recrystallization from ethanol. Solid sodium chloride was added to the water filtrate and an almost white solid separated. This material was filtered, washed with water and then recrystallized from ethanol to yield 0.7 g. of an almost white solid of 4-acrylamido-2-chloro-alpha-benzoylacetanilide with M.P. 144–146° C.

Other useful unsaturated color formers can be made in like manner by substituting for the amino compound to be reacted with acrylyl chloride or methacrylyl chloride of the examples. Thus, the following compounds can be made from the corresponding amino compounds:

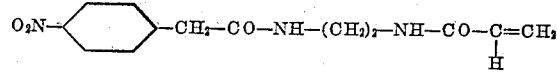

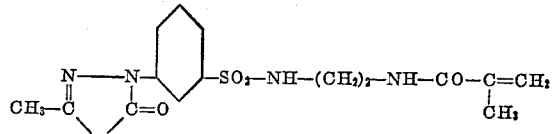

and

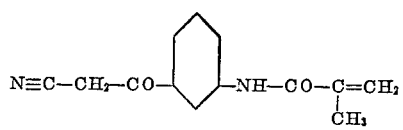

When the color formers of the above examples are present in a gelatino-silver bromoiodo emulsion layer of respective photographic films and the film is exposed and developed in an aqueous alkaline developer solution containing p-amino-N,N-diethylaniline hydrochloride as the developing agent, excellent azomethine dye images are formed in situ with the developed silver image. Upon removal of the silver and silver salts, the dye images remain. The azomethine dyes of the respective examples have colors as follows:

Example 1—magenta
  Example 2—yellow
  Example 3—yellow
  Example 4—yellow

Photographic multicolor films can be made by using in the various emulsion layers which are so disposed with respect to a yellow filter layer and have a sensitivity that each emulsion records light from a different color, red, green and blue of the visible spectrum, a color former or color formers of the invention, and form a dye complementary in color, blue-green (cyan), magenta and yellow.

The color formers of Examples 1 and 3 result in color developed dyes which have excellent spectral properties being superior to known dyes and therefore are of considerable commercial importance.

Although homopolymers of any of the novel monomeric addition polymerizable color formers of this invention are useful polymers, useful copolymers can be made by incorporating at least one non-color forming comonomer in the polymer chain to modify the solubility, compatibility, flexibility, hydrophilicity, thermal stability or other physical or chemical properties. For polymers useful in color photography, comonomers such as acrylic acid, acrylamide or their closely related derivatives are particularly useful. Other useful comonomers may be chosen from among acrylonitrile, the acrylate and methacrylate esters including the beta-amino-ethyl esters, the vinyl esters, styrene and ring substituted styrenes, vinylidene chloride, vinyl alkyl ethers, vinyl pyrrolidone, vinyl pyridine, vinyl sulfonic acid, etc. The latter addition polymerizable comonomers can be used in an amount from 5% or less to 80% by weight, or more, of the mixture containing addition polymerizable monomers of this invention.

While the dye intermediates of the present invention are particularly useful in the field of color photography, they are not limited to that use. They can be used in photopolymerizable compositions to make relief images or other types of shaped articles as described in assignee's Cohen and Firestine U.S. application Ser. No. 749,470, filed July 18, 1958. They have the advantages described in that application. These compositions may contain an initiator and a filler material, such as a water-soluble resin or polymer, e.g., polymethacrylic acid, polyvinyl alcohol and cellulose/acetate/phthalates; or an insoluble, inorganic material, e.g., glass powder, silica or diatomaceous earth. Suitable other materials are disclosed in Plambeck U.S. Patent 2,760,863.

The unsaturated color formers or dye intermediates as well as their addition polymers can be used to make colored plastic materials and in the dyeing or coloring of textile materials.

The invention in addition to the foregoing advantages has the advantage that it provides a new class of useful color formers. They can be made from available chemicals and do not require tedious or involved synthesis. Still further advantages will be apparent from the above description and properties of the novel compounds of the invention.

What is claimed is:

1. A monomeric compound of the formula:

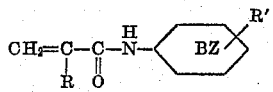

wherein R is a member selected from the group consisting of hydrogen and methyl and R' is a color forming nucleus containing an active methylene group having a trivalent nitrogen atom linked by the monovalent bond to the benzene nucleus BZ and being selected from the group consisting of 1-pyrazole-5-one-3-carboxylic acid and benzoylacetamido.

2. 1-(m-acrylamidophenyl)-5-pyrazolone-3-carboxylic acid.

3. 1-(m-methacrylamidophenyl) - 5 - pyrazolone-3-carboxylic acid.

4. m-Methacrylamido-alpha-benzoylacetanilide.

References Cited in the file of this patent

UNITED STATES PATENTS

| 2,320,089 | Lichty | May 25, 1943 |
| 2,529,455 | Mowry | Nov. 7, 1950 |
| 2,635,960 | Sprung | Apr. 21, 1953 |

OTHER REFERENCES

Jacobson: Chem. Abstracts, vol. 40, col. 837 (1946).